(12) United States Patent  (10) Patent No.: US 9,274,705 B2
Son et al.  (45) Date of Patent: Mar. 1, 2016

(54) MOBILE TERMINAL AND METHOD FOR CONTROLLING THE SAME

(75) Inventors: Joo-Hee Son, Seoul (KR); Young-Hoon Song, Seoul (KR); Hyo-Jin Suh, Seoul (KR); Seung-Hwan Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 916 days.

(21) Appl. No.: 12/484,133

(22) Filed: Jun. 12, 2009

(65) Prior Publication Data

US 2010/0097321 A1 Apr. 22, 2010

(30) Foreign Application Priority Data

Oct. 17, 2008 (KR) .................. 10-2008-0102219

(51) Int. Cl.
*G06F 3/0488* (2013.01)

(52) U.S. Cl.
CPC ........ *G06F 3/04886* (2013.01); *G06F 3/04883* (2013.01)

(58) Field of Classification Search
CPC ... G06F 3/048; G06F 3/04845; G06F 3/0426; G06F 3/04886; G06F 2203/04808; G06F 3/04883
USPC .......... 345/168–169, 173; 715/773, 763, 810, 715/73, 863, 764
See application file for complete search history.

(56) References Cited

U.S. PATENT DOCUMENTS

| | | | | |
|---|---|---|---|---|
| 5,471,578 A | * | 11/1995 | Moran ................ | G06F 3/04842 715/764 |
| 7,752,563 B2 | * | 7/2010 | Ice ...................... | G06F 3/0482 345/168 |
| 7,978,176 B2 | * | 7/2011 | Forstall et al. ................ | 345/158 |
| 2004/0119763 A1 | * | 6/2004 | Mizobuchi .......... | G06F 3/04883 715/863 |
| 2005/0108620 A1 | * | 5/2005 | Allyn .................. | G06F 3/04845 715/255 |
| 2005/0122313 A1 | * | 6/2005 | Ashby ............................ | 345/168 |
| 2005/0162402 A1 | * | 7/2005 | Watanachote ................ | 345/173 |
| 2005/0206730 A1 | * | 9/2005 | Hagiwara ............. | G06F 3/0426 348/169 |
| 2005/0248525 A1 | * | 11/2005 | Asai .................... | G06F 3/04886 345/156 |
| 2006/0085767 A1 | * | 4/2006 | Hinckley ............. | G06F 3/04883 715/863 |
| 2006/0092180 A1 | * | 5/2006 | Hasegawa ........... | G06F 3/04886 345/629 |
| 2007/0268261 A1 | * | 11/2007 | Lipson .................. | G06F 1/1616 345/169 |
| 2008/0158189 A1 | | 7/2008 | Kim | |
| 2008/0178126 A1 | * | 7/2008 | Beeck et al. .................. | 715/863 |

(Continued)

FOREIGN PATENT DOCUMENTS

CN 101266520 9/2008
EP 1383034 1/2004

(Continued)

OTHER PUBLICATIONS

European Patent Office Application Serial No. 09163690.2, Office Action dated Apr. 23, 2014, 6 pages.

*Primary Examiner* — Matthew Fry
(74) *Attorney, Agent, or Firm* — Lee, Hong, Degerman, Kang & Waimey

(57) ABSTRACT

Disclosed are a terminal in which a shape or configuration of a virtual keypad is transformable by considering user's convenience and a method for controlling the same, the terminal including: a display module configured to display a virtual keypad; a user input unit configured to receive a touch or drag input from a user; and a controller configured to transform the shape of the virtual keypad according to a dragged direction or dragged length when a spot of the virtual keypad is touched to be dragged in a specific direction.

16 Claims, 17 Drawing Sheets

(56) References Cited

U.S. PATENT DOCUMENTS

| | | | |
|---|---|---|---|
| 2008/0186274 A1* | 8/2008 | Chang | G06F 3/0481 345/156 |
| 2008/0284744 A1* | 11/2008 | Park et al. | 345/173 |
| 2008/0297377 A1* | 12/2008 | Wang | G06F 1/1626 341/22 |
| 2009/0058815 A1* | 3/2009 | Jeon et al. | 345/169 |
| 2009/0167706 A1* | 7/2009 | Tan | G06F 3/04886 345/173 |
| 2009/0237361 A1* | 9/2009 | Mosby et al. | 345/173 |
| 2010/0141484 A1* | 6/2010 | Griffin | G06F 1/1616 341/22 |
| 2010/0289824 A1* | 11/2010 | Atzmon | G06F 3/04886 345/647 |
| 2011/0047459 A1* | 2/2011 | Van Der Westhuizen | 715/702 |
| 2012/0206363 A1* | 8/2012 | Kyprianou | G06F 3/04886 345/168 |

FOREIGN PATENT DOCUMENTS

| | | |
|---|---|---|
| EP | 1536316 | 6/2005 |
| KR | 10-2005-0019906 | 3/2005 |

\* cited by examiner

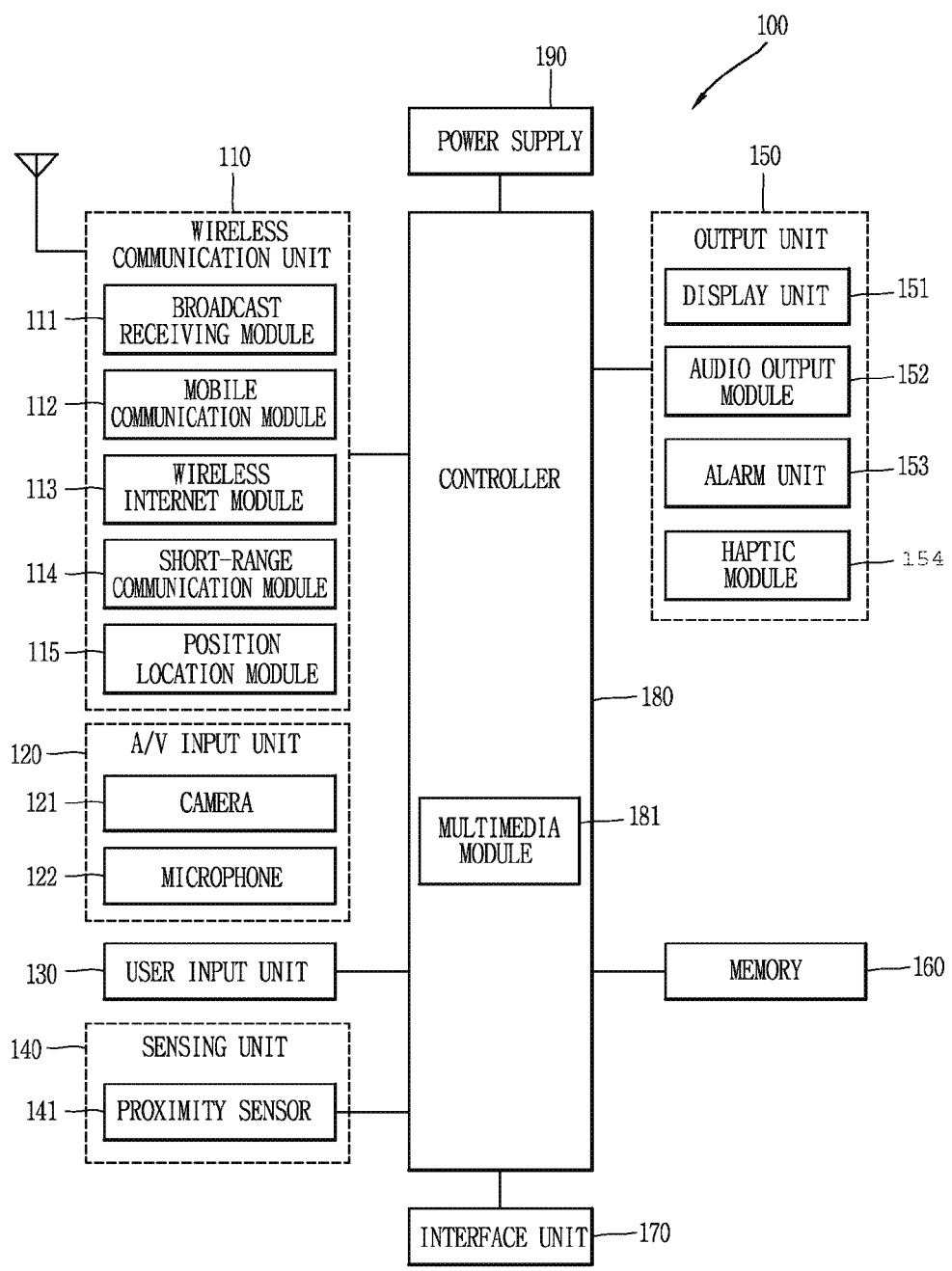

FIG. 8A
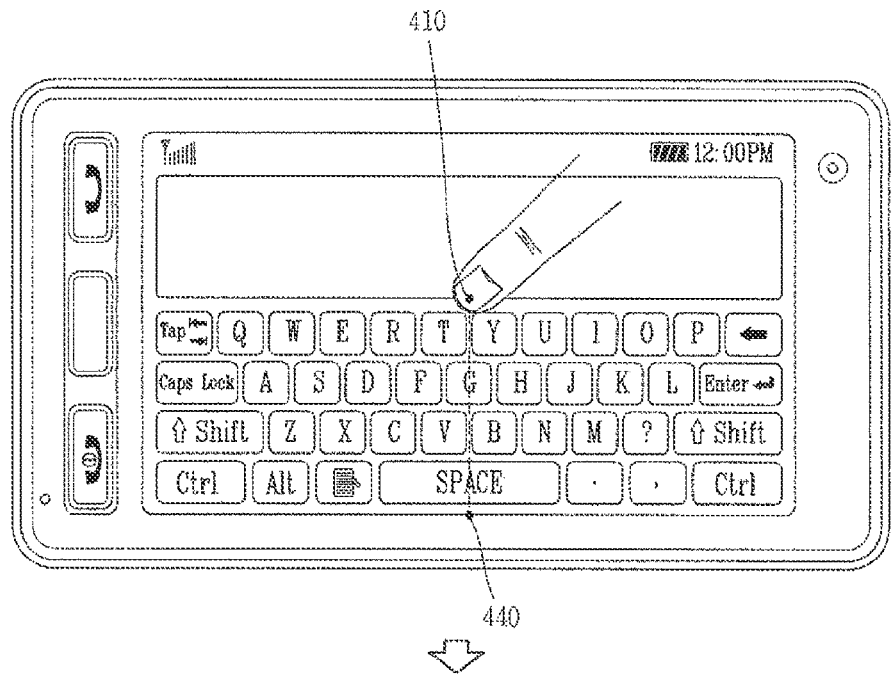
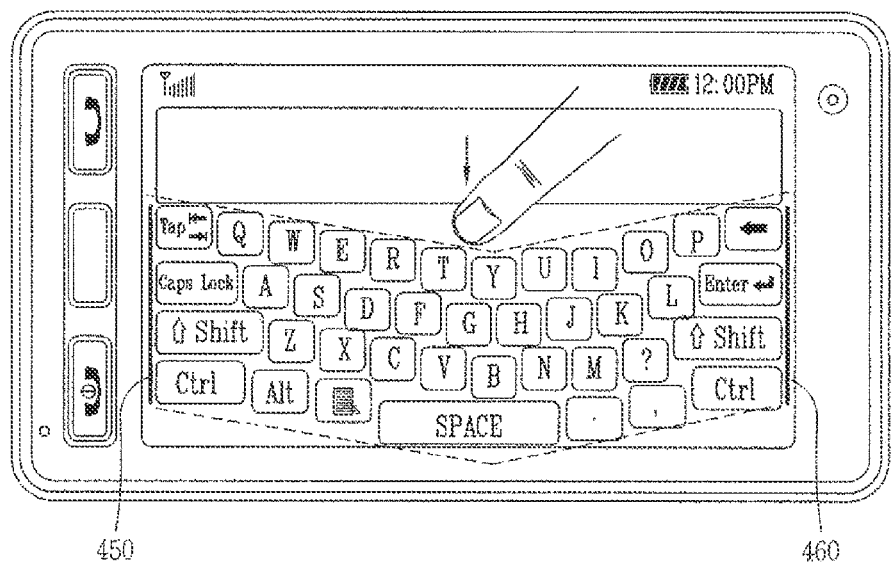

FIG. 8B
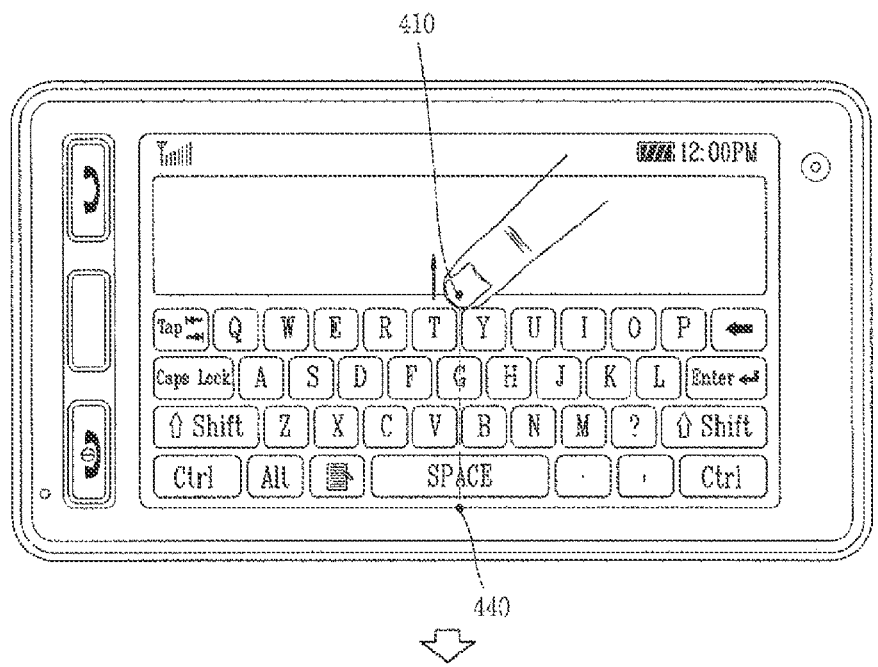
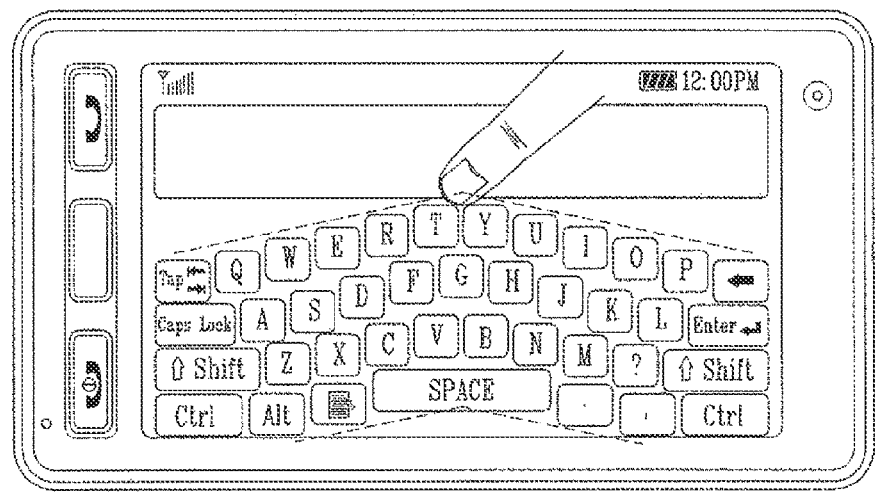

FIG. 9A
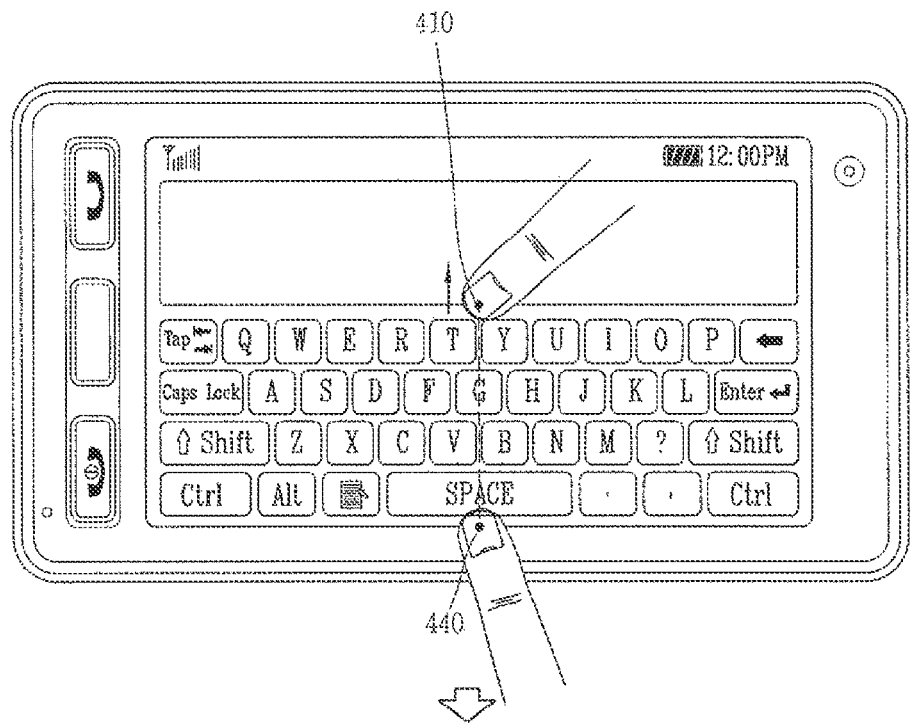
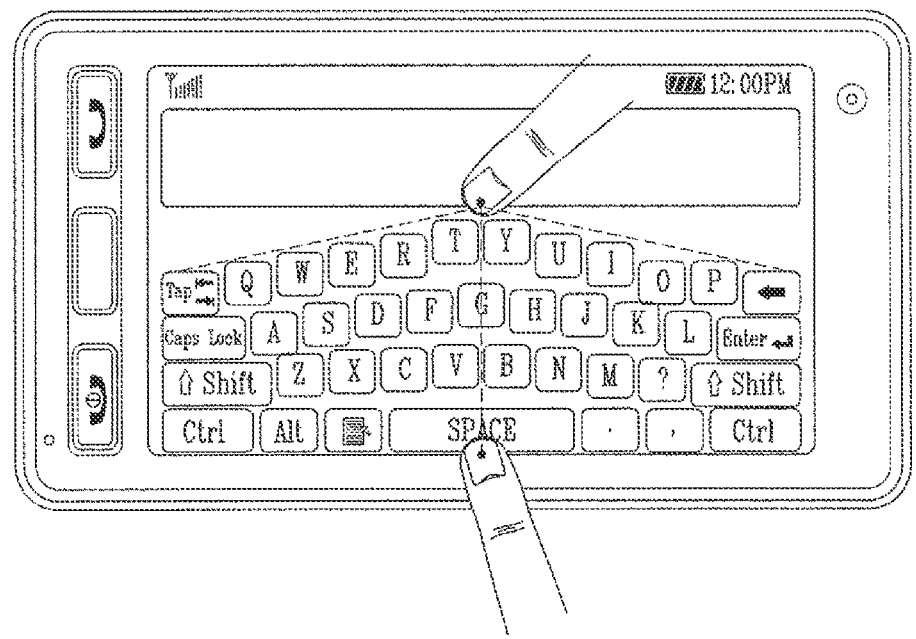

MOBILE TERMINAL AND METHOD FOR CONTROLLING THE SAME

CROSS-REFERENCE TO RELATED APPLICATIONS

Pursuant to 35 U.S.C. §119(e), this application claims the benefit of earlier filing date and right of priority to Korean Patent Application No. 10-2008-0102219, filed on Oct 17, 2008, the contents of which are hereby incorporated by reference herein in its entirety.

BACKGROUND OF THE INVENTION

1. Field of the Invention

The present invention relates to a mobile terminal capable of transforming (changing) a shape or construction of a virtual keypad for the sake of user's convenience and a method for controlling the same.

2. Background of the Invention

Terminals may be divided into a mobile/portable terminal and a stationary terminal according to their mobility. The mobile terminal may then be categorized into a handheld terminal and a vehicle mounted terminal according to whether a user can carry it around.

As functions of a terminal become more diversified, the terminal may support more complicated functions such as capturing still images or video, play music or video files, play games, receive broadcast signals and the like. By comprehensively and collectively implementing such functions, the portable terminal may be embodied as a multimedia player or device.

Considerable efforts have been expended to support or enhance various functions of mobile terminals. Such efforts include not only changes and improvement of structural components of the mobile terminal, but also software and hardware improvement.

Recently, to meet user's requirements of a mobile terminal which has a small size and a larger display, the use of a mobile terminal, which has a decreased number of buttons disposed at a front surface of the mobile terminal but rather has a larger touch screen, is increased.

Accordingly, user interface environments are also changed to be suitable for the use of the touch screen.

A representative user interface suitable for the touch screen can be a virtual keypad. However, the virtual keypad has been modeled on a typical keypad. Accordingly, when inputting information using the virtual keypad of a terminal with a small-sized display module, it may lower a user's convenience. Thus, a method for allowing a user to use such virtual keypad more conveniently is required.

SUMMARY OF THE INVENTION

To solve the drawbacks of the related art, the present invention provide a terminal including: a display module configured to display a virtual keypad; a user input unit configured to receive a touch or drag input from a user; and a controller configured to transform the shape of the virtual keypad according to a dragged direction or dragged length when a spot of the virtual keypad is touched to be dragged in a specific direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a mobile terminal according to one embodiment of the present invention;

FIGS. 8a and 8b are exemplary views showing a method for changing a virtual keypad in accordance with the present invention;

FIGS. 9a to 9c are exemplary views showing another method for changing a shape of a virtual keypad in accordance with the present invention;

DETAILED DESCRIPTION OF THE INVENTION

Figure 2A:
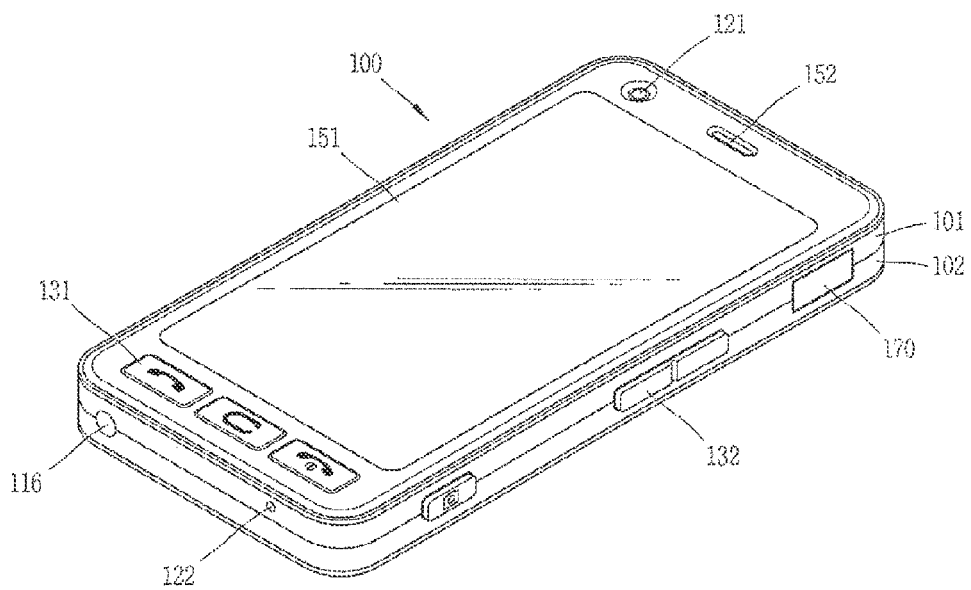
FIG. 2a is a front perspective view of the mobile terminal in accordance with the one embodiment of the present invention.

An object of the present invention is to provide a mobile terminal capable of changing a configuration or shape of a virtual keypad by considering user's convenience and a method for controlling the same.

Another object of the present invention is to provide a mobile terminal capable of adjusting a key arrangement according to a configuration or shape of a virtual keypad and a method for controlling the same.

Another object of the present invention is to provide a mobile terminal capable of changing a shape or size of each key configuring a virtual keypad according to the configuration or shape of the virtual keypad, and a method for controlling the same.

Another object of the present invention is to provide a mobile terminal capable of changing a position of each key configuring a virtual keypad according to a configuration or shape of the virtual keypad, and a method for controlling the same.

Description will now be given in detail of preferred configurations of mobile terminals according to the present invention, with reference to the accompanying drawings.

Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

A mobile terminal described in the present invention may be implemented using different types of terminals. Examples of such terminals include mobile/portable terminals, such as mobile phones, smart phones, notebook computers, digital broadcast terminals, Personal Digital Assistants (PDA), Portable Multimedia Players (PMP), navigators and the like, and stationary terminals, such as digital TVs, desktop computers and the like. The following description assumes that the terminal is a mobile terminal. However, it can be easily understood by those skilled in the art that the configuration according to the following description can be applied to the stationary terminals except for components particularly provided for mobility.

FIG. 1 is a block diagram of a mobile terminal according to one embodiment of the present invention.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a mobile terminal. An example of the position location module 115 may include a Global Position System (GPS) module.

Referring to FIG. 1, the AN input unit 120 is configured to provide audio or video signal input to the mobile terminal. The AN input unit 120 may include a camera 121 and a microphone 122. The camera 121 receives and processes image frames of still pictures or video obtained by image sensors in a video (telephony) call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device and the like. Here, the sensing unit 140 may include a proximity sensor 141.

The output unit 150 is configured to output an audio signal, a video signal or an alarm signal. The output unit 150 may include a display 151, an audio output module 152, an alarm 153, a haptic module 154 and the like.

The display 151 may output information processed in the mobile terminal 100. For example, when the mobile terminal is operating in a phone call mode, the display 151 will provide a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface of the display 151 can also be configured to be transparent. Accordingly, a user can see an object, which is located at the rear side of the terminal body, via a region occupied by the display 151.

The mobile terminal 100 may include two or more of such displays 151 according to its configuration. For example, the mobile terminal 100 may include a plurality of displays, which are disposed at one surface to be spaced apart from each other or integrally disposed thereat. Alternatively, the plurality of displays may be disposed at different surfaces, respectively.

If the display 151 is layered with sensors for detecting a touch input (hereinafter, referred to as a 'touch sensor'), which will be called 'touch screen' hereinafter, the display 151 may be used as an input unit as well as an output unit. The touch sensors may be configured in various forms of touch film, touch seat, touchpad and the like, for example.

The touch sensor may be configured to convert the change in a pressure applied to a specific portion of the display 151 or the capacitance generated at the specific portion of the display 151 into an electrical input signal. The touch sensor may be configured to detect a touch input pressure as well as touch input position and touch input area.

When a touch input is detected by a touch sensor, the corresponding signal(s) may be sent to a touch controller. The touch controller may then process the signal(s) and sends the corresponding data to the controller 180. Accordingly, the controller 180 can be known of which portion of the display 151 has been touched.

Still referring to FIG. 1, the proximity sensor 141 may be disposed in an internal region of the mobile terminal 100 covered with the touch screen or near the touch screen. The proximity sensor 141 denotes a sensor for detecting whether there is an object approaching a certain detection surface or existing near the certain detection surface by using a force of an electromagnetic field or infrared rays, without any mechanical contact. Therefore, the proximity sensor 141 has a considerably long lifespan as compared to a contact sensor and also implement considerably high utility.

Examples of the proximity sensor 141 may include a transmission type photo sensor, a direct reflection type photo sensor, a mirror reflection type photo sensor, a high frequency oscillation type proximity sensor, a capacitive proximity sensor, a magnetic proximity sensor, an infrared proximity sensor and the like.

If an electrostatic touch screen is provided, the proximity of a pointer can be detected based upon the change in an electric field responsive to the proximity of the pointer. In this case, the touch screen (touch sensor) can be classified as a proximity sensor.

Hereinafter, for the sake of explanation, a behavior that the pointer is located near the touch screen without being actually contacted with each other so as to be recognized as being located above the touch screen is referred to as "proximity touch," and a behavior that the pointer is actually contacted with the touch screen is referred to as "contact touch." Also, the location at which the proximity touch of the pointer is recognized above the touch screen denotes a location at which the pointer is located perpendicularly to the touch screen in case of the proximity touch of the pointer.

The use of the proximity sensor 141 allows the detection of proximity touch and proximity touch patterns (e.g., proximity touch distance, proximity touch direction, proximity touch speed, proximity touch time, proximity touch location, proximity touch movement state and the like), and also allows the output on the touch screen of information related to the detected proximity touch operation and the proximity touch pattern.

The audio output module 152 may output audio data which is received from the wireless communication unit 110 in various modes including call reception mode, call-placing (phone call) mode, recording mode, voice recognition mode, broadcast reception mode, and the like, or audio data stored in the memory 160. Also, the audio output module 152 may output an audio signal relating to a particular function (e.g., tone for call received, tone for message received, etc.) performed in the mobile terminal 100. The audio output module 152 may be implemented using a speaker, a buzzer, or the like.

The alarm 153 may output a signal to inform a generation of event associated with the mobile terminal 100. Typical events may include call received, message received, user input received and the like. In addition to generating the audio or video signal, the alarm 153 may also inform the event generation in different manners, for example, by providing tactile sensations (e.g., vibration) to make a user identify the event generation. The video or audio signal may be outputted via the display 151 or the audio output module 152. The display 151 and the audio output module 152 may be classified as parts of the alarm 153.

The haptic module 154 may generate various tactile (haptic) effects which a user can feel. A representative one of the tactile effects generated by the haptic module 154 is a vibration. Strength and pattern of the vibration generated by the haptic module 154 can be controlled. For example, different vibrations may be combined to be output or sequentially output.

The haptic module 154 can also generate, in addition to the vibration, other effects, such as a pin arrangement performing a longitudinal motion with respect to a contact skin, an injection force or suction force of air via an injection hole or suction hole, a graze on a skin, a contact of an electrode, a stimulation by an electromagnetic force or the like, The haptic module 154 may also generate various tactile effects, such as an effect by repetition of cold and warm conditions using an endothermic device or a heating device.

The haptic module 154 may be implemented such that a tactile effect can be transferred via a direct contact or a user can feel such tactile effect via a muscular sense of his finger or arm. Two or more of the haptic module 154 may be provided according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface unit 170 is generally implemented to interface the mobile terminal 100 to external devices. Such interface unit 170 may receive data from an external device, or be provided with power and accordingly transfer the received data or power to each component within the mobile terminal 100 or transfer data of the mobile terminal 100 to an external device. The interface unit 170 may include, for example, wired/wireless headset ports, external charger ports, wired/wireless data ports, a memory card port, ports for connecting a device with an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals and power input from the cradle may operate as a signal for recognizing that the mobile terminal 100 has accurately been mounted to the cradle.

The controller 180 typically controls the overall operations of the mobile terminal. For example, the controller 180 performs the control and processing associated with voice calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

FIG. 2a is a front perspective view of a mobile terminal or portable terminal in accordance with the one embodiment of the present invention.

The mobile terminal 100 described is provided with a bar type terminal body. However, the present invention may not be limited to the type, but be applicable to various types having two or more bodies coupled to each other with implementing a relative motion, including slide type, folder type, swing type, swivel type and the like.

A case (housing, casing, cover, etc.) forming the outer appearance of the terminal body is formed by a front case 101 and a rear case 102. Various electronic components may be disposed in a space between the front case 101 and the rear case 102. One or more intermediate cases may additionally be disposed between the front case 101 and the rear case 102.

The cases can be formed of resin in a manner of injection molding, or formed using a metallic material such as stainless steel (STS) and titanium (Ti).

A display 151, an audio output module 152, a camera 121, user input units 130/131 and 132, a microphone 122, an interface 170 and the like may be disposed at the terminal body, particularly, at the front case 101.

The display 151 may occupy most of main surface of the front case 101. The audio output module 152 and the camera 121 are disposed at a region adjacent to one of both end portions of the display 151, and the user input unit 131 and the microphone 122 are disposed at a region adjacent to another end portion thereof. The user input unit 132, the interface 170 and the like may be disposed at side surfaces of the front case 101 and the rear case 102.

The user input unit 130 is manipulated to receive a command input for controlling the operation of the mobile terminal 100, and may include a plurality of manipulation units 131 and 132. Such manipulation units 131 and 132 may be referred to as a manipulating portion. Any tactile manner that a user can apply a touch input for manipulation can be employed for the user input unit 130.

Various contents can be set to be input by the first or second manipulation units 131 and 132. For example, the first manipulation unit 131 may be used to input commands, such as START, END, SCROLL and the like, and the second manipulation unit 132 may be used to input commands, such as control of volume of sound output from the audio output unit 152 or conversion of the display 151 into a touch-sensitive mode.

Figure 2B:
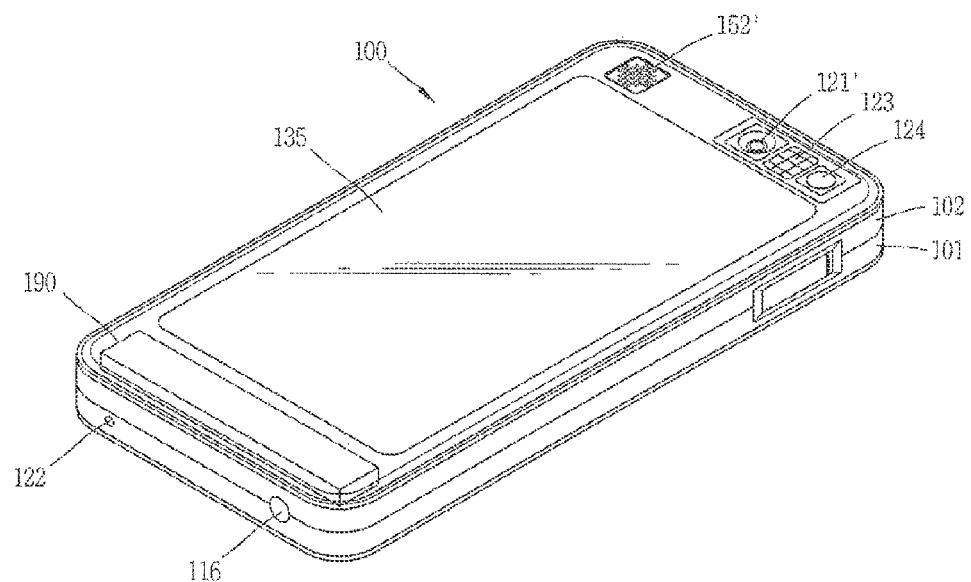
FIG. 2b is a rear perspective view of the mobile terminal in accordance with the one embodiment of the present invention.

FIG. 2b is a rear perspective view of the mobile terminal shown in FIG. 2a.

As shown in FIG. 2b, a camera 121" may further be disposed at a rear surface of the terminal body, namely, at the rear case 102. The camera 121" faces a direction which is opposite to a direction faced by the camera 121 (see FIG. 2a) and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be disposed in the terminal body to be rotated or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 152' may further be disposed at the rear surface of the terminal body. The audio output unit 152' can cooperate with the audio output module 152 (see FIG. 2a) to provide stereo output. Also, the audio output module 152' may be configured to operate as a speakerphone.

A broadcast signal receiving antenna 116 may be disposed at one side of the terminal body, in addition to an antenna for communications. The antenna 116 can implement part of the broadcast receiving module 111 (see FIG. 1) to retract into the terminal body.

A power supply 190 may be mounted in the terminal body to supply power to the mobile terminal 100. The power supply 190 may be mounted in the terminal body or be attachable to or detachable from the outside of the terminal body.

A touchpad 135 for detecting a touch input may further be disposed at the rear case 102. The touchpad 135 may be configured to be transparent as similar as the display 151. In this case, if the display 151 is configured to output visible information at both surfaces, the touchpad 135 can also be configured to output such visible information. Such information output on the both surfaces can all be controlled by the touchpad 135. Alternatively, a display may further be mounted on the touchpad 135 on the rear case 102 so as to operate as a touch screen.

The touchpad 135 can cooperate with the display 151 on the front case 101. The touchpad 135 may be disposed in parallel at the rear side of the display 151. Such touchpad 135 may have a size equal to or smaller than that of the display 151.

Hereinafter, the cooperative operation between the display 151 and the touchpad 135 will be described with reference to FIGS. 3a and 3b.

Figure 3A:
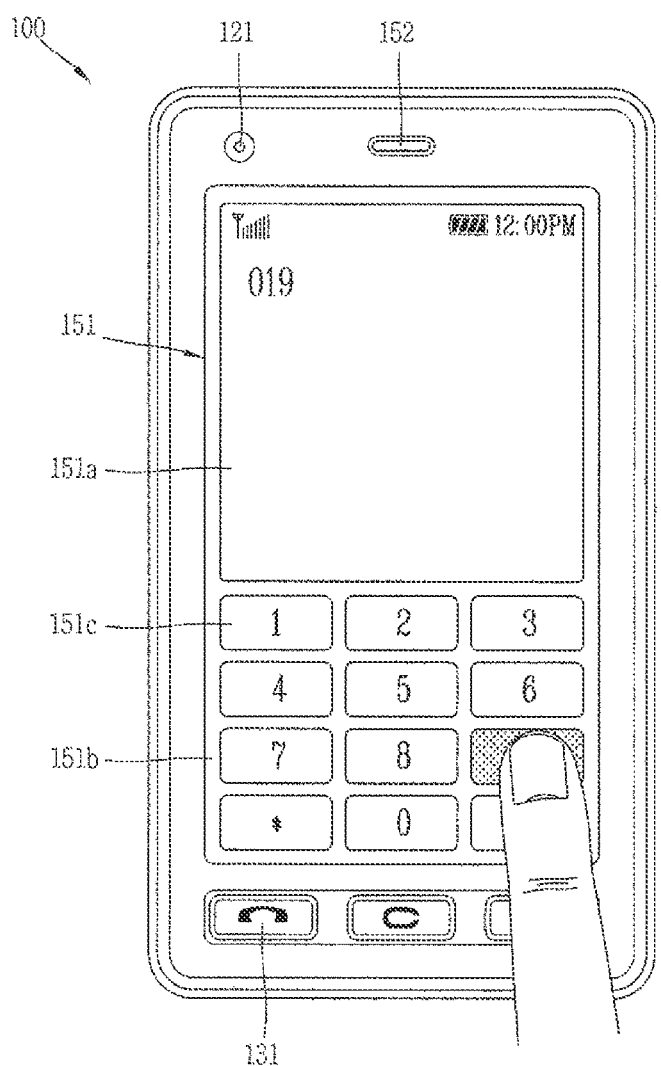
FIGS. 3a and 3b are front views showing operation states of a mobile terminal according to the present invention.
Figure 3B:
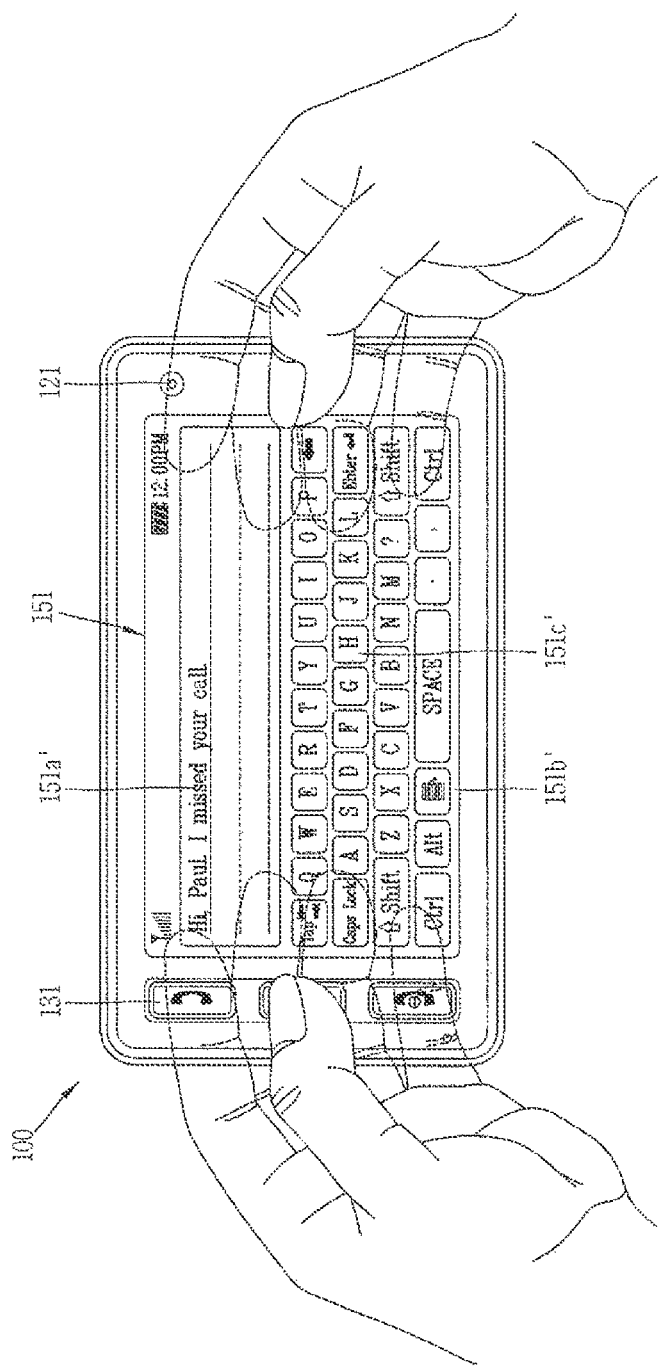

FIGS. 3a and 3b are front views showing an operation state of a mobile terminal according to the present invention.

Various types of visible information may be displayed on the display 151. Such information may be represented in the form of characters, numbers, symbols, graphics, or icons.

In order to input the information, at least one of the characters, numbers, symbols, graphics and icons may be displayed in a certain arrangement, so as to be implemented as a type of keypad, which may be called as 'soft key'.

FIG. 3a shows a touch input applied on a soft key from a front surface of the terminal body.

The display 151 may operate as one entire region or by being divided into a plurality of regions. For the latter, the plurality of regions may be configured to cooperate with each other.

For example, an output window 151a and an input window 151b are displayed on upper and lower portions of the display 151. The output window 151a and the input window 151b are allocated for output and input of information, respectively. Soft keys 151c with numbers represented thereon for inputting a phone number or the like are output on the input window 151b. Upon touching one of the soft keys 151c, a number or the like corresponding to the touched soft key 151c is displayed on the output window 151a. When operating the first manipulation unit 131, a call connection for the phone number displayed on the output window 151a is attempted.

FIG. 3b shows a touch input applied on a soft key from a rear surface of the terminal body. FIG. 3a shows that the terminal body is vertically oriented (i.e., portrait), while FIG. 3b shows the terminal body is horizontally oriented (i.e., landscape). The display 151 may be configured such that its output screen can be changed in cooperation with the arrangement direction of the terminal body.

FIG. 3b shows that a text input mode is activated in the mobile terminal. Output window 151a' and input window 151' are displayed on the display 151. The input window 151b' may be provided with a plurality of soft keys 151c' each having thereon at least one of character, symbol and number. The soft keys 151c' may be arranged in a QWERTY configuration.

When the soft keys 151c' are touched via the touchpad 135 (see FIG. 2b), characters, numbers or symbols corresponding to the touched soft keys 151c' are displayed on the output window 151a'. As such, as compared to the touch input via the display 151, the touch input via the touchpad 135 can prevent the soft key 151c' from being obscure by a finger upon being touched. When the display 151 and the touchpad 135 are transparently configured, fingers located at the rear surface of the terminal body can visibly be recognized, which allows the more accurate touch input.

In addition to the input methods described in the above embodiments, the display 151 or the touchpad 135 may be configured to receive a touch input in a scrolling manner. A user can scroll the display 151 or the touchpad 135 so as to move a cursor or pointer located on an object (subject, item or the like), for example, an icon, displayed on the display 151. In addition, when moving a finger on the display 151 or the touchpad 135, a path tracing the finger can visibly be displayed on the display 151. This may be useful when editing an image displayed on the display 151.

In cooperation with a simultaneous touch of the display 151 (touch screen) and the touchpad 135 within a certain period, one function of the terminal can be executed. An example of the simultaneous touch may include clamping the terminal body by a user using his thumb and index finger. The one function may be an activation or deactivation of the display 151 or the touchpad 135, for example.

The proximity sensor 141 described with reference to FIG. 1 will now be explained in more detail with reference to FIG. 4.

Figure 4:
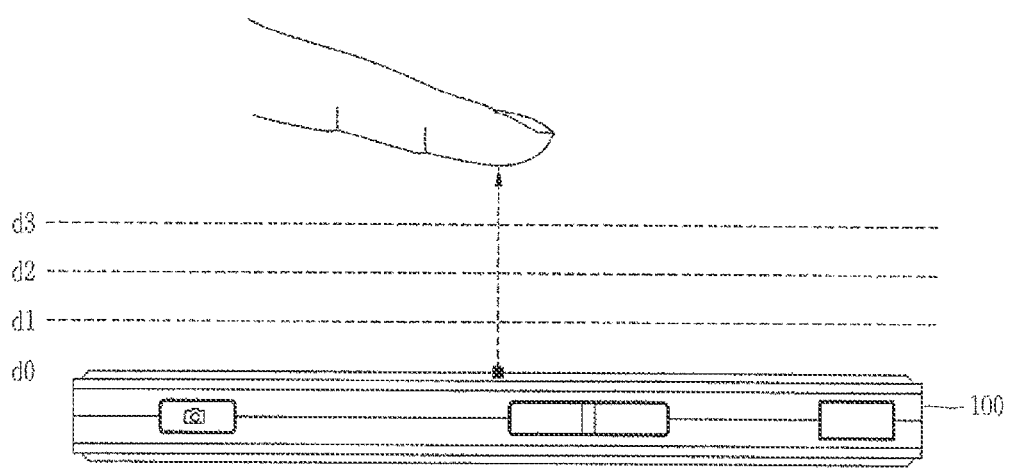
FIG. 4 is an overview showing a proximate depth of a proximity sensor.

FIG. 4 is a conceptual view showing a proximate depth of a proximity sensor.

As shown in FIG. 4, when a user's finger or a pointer such as a pen closely approaches the touch screen, the proximity sensor 141 disposed in or near the touch screen senses the approach, thereby outputting a proximity signal.

The proximity sensor 141 may be configured to output a different proximity signal depending on a distance between a pointer and the touch screen (hereinafter, referred to as 'proximate depth').

FIG. 4 exemplarily shows a section of the touch screen having a proximity sensor for detecting three proximate depths, for example. Also, a proximity sensor for detecting less than three or more than four proximate depths can be employed.

In detail, when the pointer completely contacts the touch screen (d0), it is considered as a contact touch. When the pointer is spaced apart from the touch screen by a distance d1, it is considered as a proximity touch with a first proximate depth. When the pointer is spaced apart from the touch screen by a distance between d1 and d2, it is considered as a proximity touch with a second proximate depth. When the pointer is spaced apart from the touch screen by a distance between d2 and d3, it is considered as a proximity touch with a third proximate depth. When the pointer is spaced apart from the touch screen farther than a distance d3, it is considered as a proximity touch being not detected (being released).

Therefore, the controller 180 can identify (consider) the proximity touches as a variety of input signals, according to the proximate depth and proximate location of the pointer, and also execute various operation controls according to the input signals.

Figure 5:
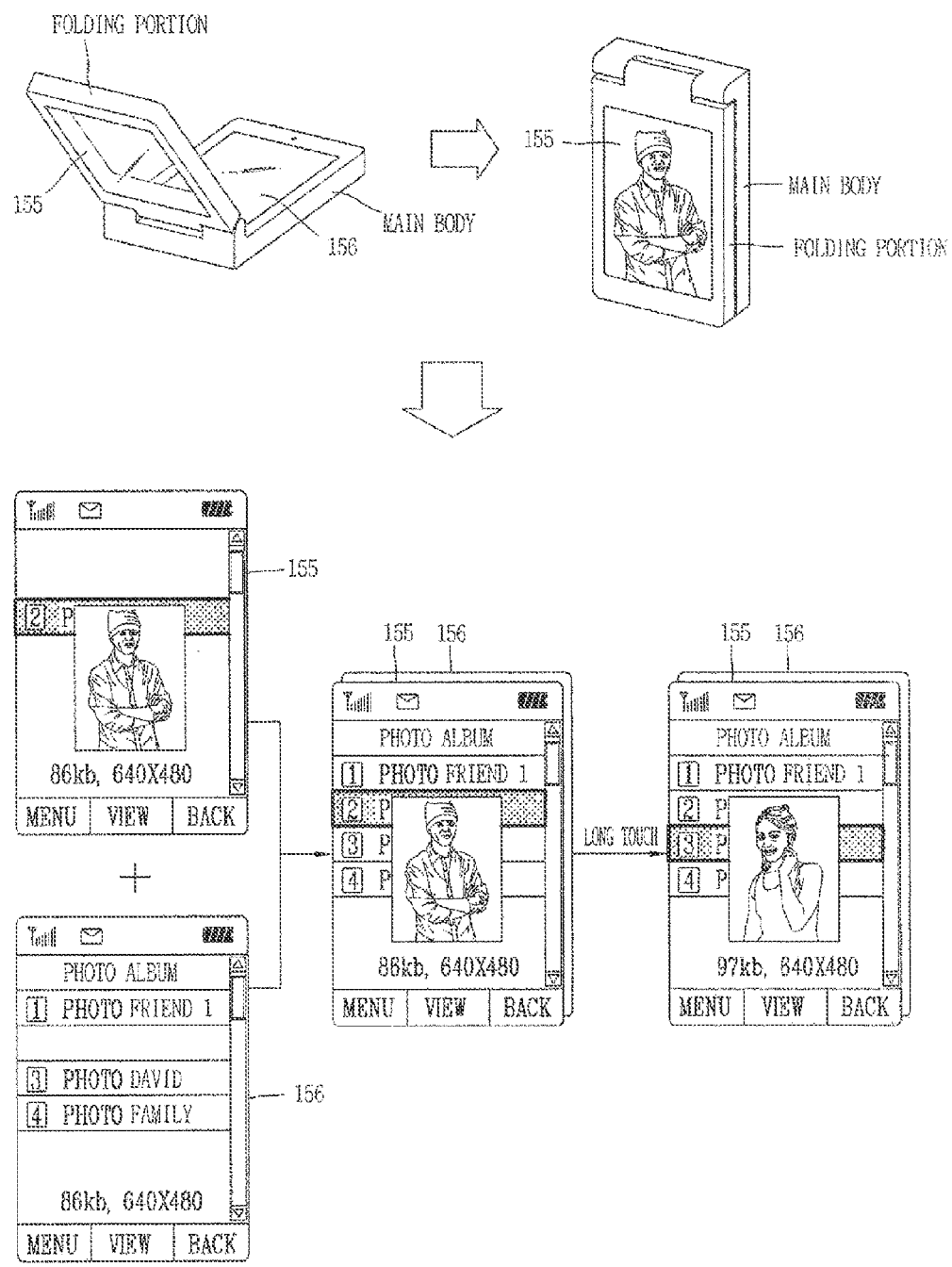
FIG. 5 is an overview showing a control method for a touching operation in an overlapped state of a pair of displays.

FIG. 5 is a conceptual view showing a method for controlling a touching operation in an overlapped state of a pair of displayers 155 and 156.

A mobile terminal disclosed in the drawing is a folder type mobile terminal having a folding portion foldable with respect to a main body. A first displayer 155 mounted at the folding portion may be light-transmittable or transparent such as TOLED, while a second displayer 156 mounted at the main body may be non-transmittable such as LCD. Each of the first and second displayers 155 and 156 may be implemented as a touch screen supporting a touch input.

For example, when a touch (contact touch or proximity touch) is detected on the first displayer or TOLED 155, the controller 180 can control such that at least one image in an image list displayed on the TOLED 155 can be selected or run according to a type of touch or a continuous touch time.

Hereinafter, a method for controlling information displayed on another displayer or LCD 156 upon touching the TOLED 155 externally exposed in an overlapped state will be described based upon different touching manners divided into touch, long touch, long touch & drag and the like.

In the overlapped state (i.e., in a closed state of the mobile terminal), the TOLED 155 is overlapped on the LCD 156. In this state, when another type of touch, different from the previously described touch for controlling the image displayed on the TOLED 155, for example, a long touch (e.g., a touch lasted for longer than two or three seconds) is detected, the controller 180 then controls such that at least one image is selected from the image list displayed on the LCD 156 according to the detected touch input. The results from the running of the selected image are displayed on the TOLED 155.

The long touch may be used when selectively moving a desired object among objects displayed on the LCD 156 (without running the corresponding object) to the TOLED 155. That is, when a user long touches one portion of the TOLED 155 corresponding to a specific object, the controller 180 allows the corresponding object to be displayed onto the TOLED 155. Also, the object displayed on the TOLED 155 can be moved to the LCD 156 to be displayed thereon by a certain touch input, for example, in a flicking or swirling manner. FIG. 5 exemplarily shows that a menu 2 displayed on the LCD 156 is moved to the TOLED 155 to be displayed thereon.

When another touch input such as a drag is detected together with a long touch, the controller 180 allows a function related to an image selected by the long touch to be performed, for example, a preview screen for the image to be displayed on the TOLED 155. In this drawing, a preview screen (e.g., a man's photograph) of the menu 2 (i.e., the image file) is displayed.

In the state of the preview screen being outputted, when a dragging toward another image on the TOLED 155 is executed with maintaining the long touch, the controller 180 moves a selection cursor (or selection bar) of the LCD 156 to display an image (e.g., a woman's photograph) selected by the selection cursor on a preview screen. Afterwards, when the touch (i.e., the long touch and the drag) is not detected any more, the controller 180 then displays the original image selected by the long touch.

The touching action (e.g., the long touch and the drag) may equally be applied when a sliding (an action of a proximity touch corresponding to the drag) is detected together with a long proximity touch (i.e., a proximity touch lasted for at least longer than 2 or 3 seconds) on the TOLED 155.

When other touches excluding the aforesaid actions are detected, the controller 180 may be operated as the same as executing a general touch control method.

The method for controlling the touch in the overlapped state can be applied to a type of terminal having a single display. Alternatively, such method may be applied to other terminals having a dual display, excluding the folder type terminal.

Hereinafter, the preferred embodiments of a control method, which can be implemented in the terminal having such configuration, will be described with reference to the accompanying drawings. The embodiments to be explained will be implemented independently or in combination thereof. Also, the embodiments to be explained will be used in combination with a user interface (UI) to be described later.

As described with reference to FIGS. 3a and 3b, characters, numbers, symbols, graphics or icons for inputting information may be implemented on the display 151 of the terminal in the form of a keypad with a particular arrangement. Such keypad may be referred to as 'virtual keypad' and be implemented in a QWERTY configuration. Hereinafter, the 'virtual keypad' will simply be said as 'keypad', and may be applicable to a keypad without the QWERTY configuration.

The 'virtual keypad' may be configured such that an output screen can be automatically converted into a horizontal (landscape) direction or a vertical (portrait) direction depending on an orientation of a terminal body. For the sake of explanation, it is assumed in the preferred embodiments of the present invention that the virtual keypad is displayed in the landscape direction.

The present invention relates to a method for changing (transforming, converting, altering) the shape or key arrangement of the virtual keypad for a user's convenience. In addition, the present invention provides a method for changing the shape or size of each key constituting the keypad, responsive to the change in the shape of the virtual keypad. The drawings for the preferred embodiments of the present invention may illustrate specific parts required for the description, other than illustrating an overall virtual keypad.

The terminal according to the present invention may be provided with a mode (hereinafter, referred to as a virtual keypad transformation mode) for transforming the shape of the virtual keypad or the shape or arrangement of each key configuring the virtual keypad. For the sake of description, it is assumed in the preferred embodiments of the present invention that the terminal has entered the virtual keypad transformation mode.

Figure 6A:
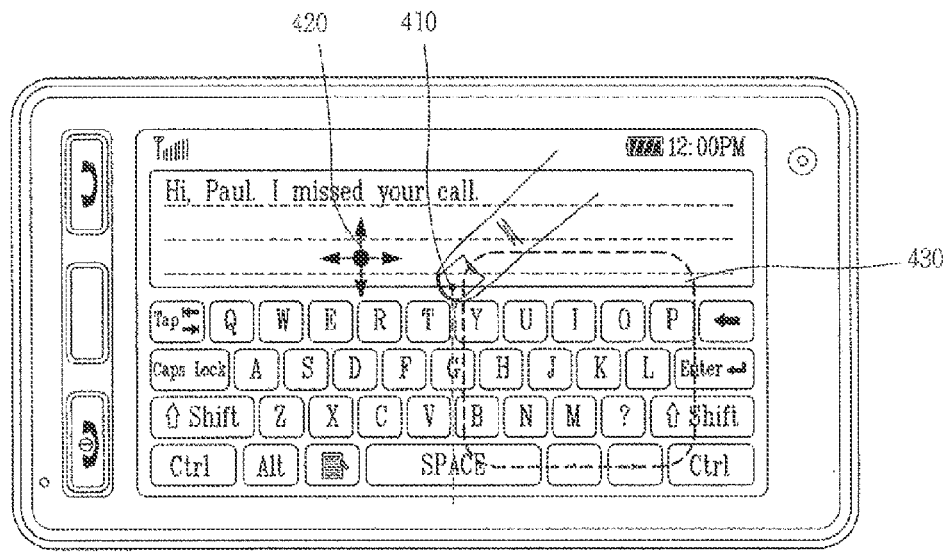
FIGS. 6a to 6d are exemplary views showing a method for changing a shape of a keypad of a terminal in accordance with the present invention.
Figure 6B:
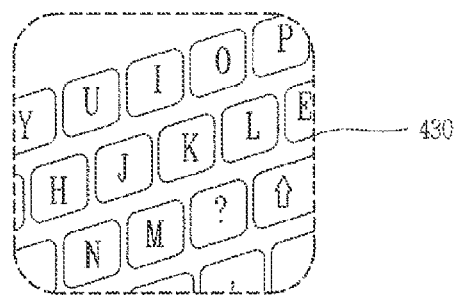
Figure 6C:
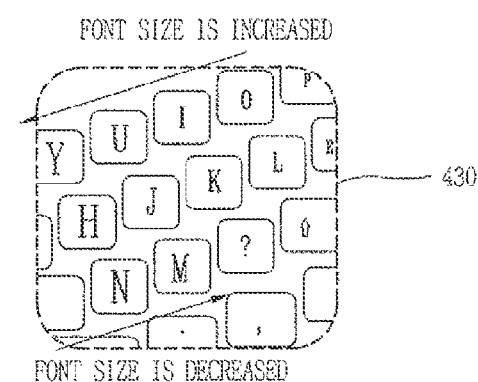
Figure 6D:
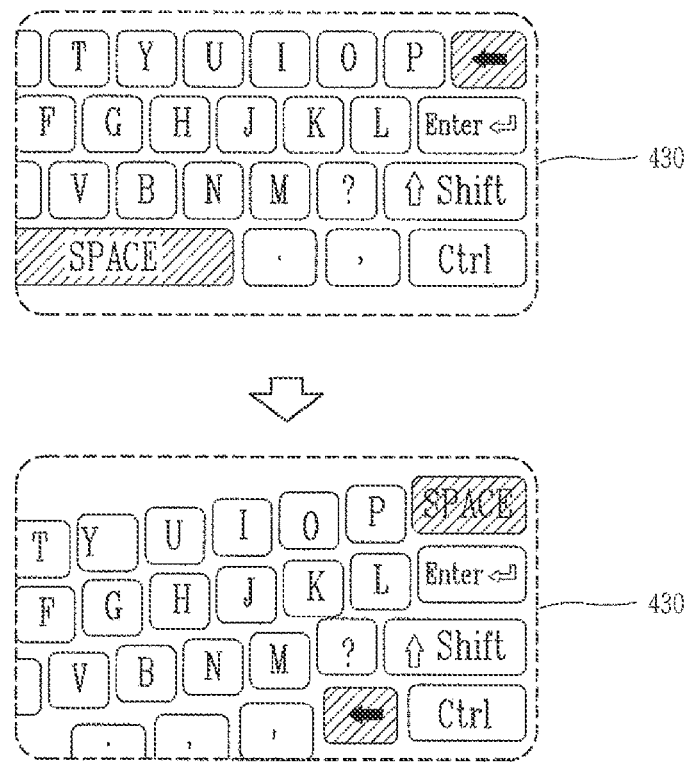
Figure 7:
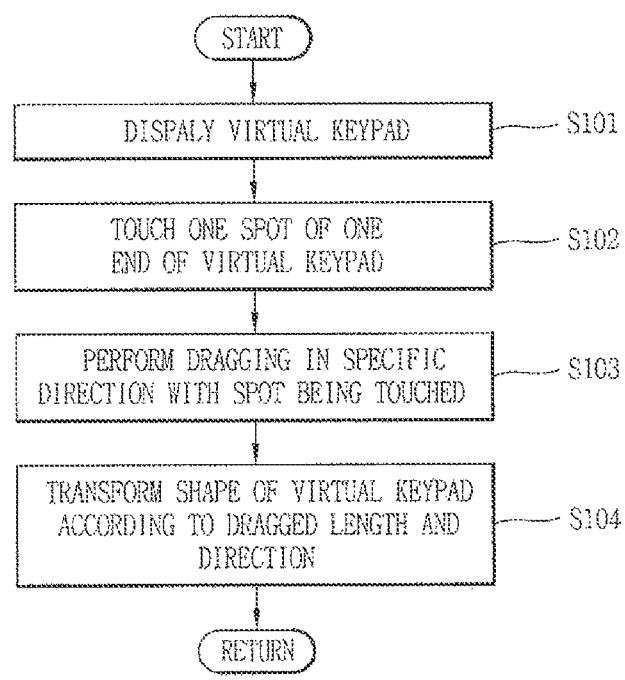
FIG. 7 is a flowchart showing a method for changing a configuration of a keypad of a terminal in accordance with the present invention.

FIGS. 6a to 6d are exemplary views showing a method for transforming a shape of a keypad in a terminal according to the present invention, and FIG. 7 is a flowchart showing a method for transforming a configuration or shape of a keypad in a terminal according to the present invention.

Hereinafter, as shown in FIG. 6a, under the assumption that a virtual keypad is displayed (S101), a user can touch with high finger or the like a particular spot 410 at one end (e.g., an uppermost end or a lowermost end) of the virtual keypad (S102). The user can then drag the finger or the like in a specific direction (e.g., an upward direction or a downward direction) with continuously touching the spot 410 (S103).

Here, when the spot 410 of the one end of the virtual keypad is touched, the controller 180 can display an indicator 420 by using a specific image, thus to indicate directions to be possibly dragged from the touched spot 410.

When the user then performs a dragging in a specific direction with continuously touching the one spot 410 of the one end of the virtual keypad, the controller 180 can change the form (shape or configuration) of the virtual keypad according to the dragged direction (S104). That is, at least one side of the virtual keypad is pulled or pushed according to the dragged length and direction, so as to transform the shape to be extended, reduced or inclined.

As the shape of the virtual keypad is transformed, the controller 180 may widen or shorten a gap between keys. Alternatively, the controller 180 may increase or decrease the size of each key. Hereinafter, only a specific portion 430 of the virtual keypad will be described.

As shown in FIG. 6b, each of keys is rotated by an inclined angle of a virtual keypad. A font size on each key may automatically be adjustable as shown in FIG. 6c. Also, as shown in FIG. 6d, function keys located at specific positions may be moved to different positions.

FIGS. 8a and 8b are exemplary views showing a method for changing (transforming) a shape of a virtual keypad according to the present invention.

As shown in FIG. 8a, in a state where a user touches a spot 410 on an uppermost end of the virtual keypad using his finger, if the user drags his finger in a specific direction (e.g., a downward direction) as if he pushes the spot 410, then the controller 180 transforms the shape of the keypad in the dragged direction. Here, the controller 180 transforms the keypad to be in a V-like (v) shape based upon an axis connecting the touched spot 410 of the uppermost end of the virtual keypad and a lowermost spot 440 of a lowermost end corresponding to the spot 410.

That is, the uppermost spot 410 may be pushed downwardly in the dragged direction, while the lowermost spot 440 corresponding to the touched uppermost spot 410 is pushed out. Both side ends 450 and 460 (e.g., left end and right end) of the virtual keypad are raised in an opposite direction (i.e., an upward direction) to the dragged direction (i.e., the downward direction), such that the virtual keypad can generally be transformed in the V-like (v) shape.

However, in the state where the size of each key and the key arrangement are maintained, if the virtual keypad is transformed in the V-like shape, both side ends are raised and a central portion is descended, resulting in a further increase in a region for displaying the virtual keypad.

Therefore, in order to prevent such further increase in the display region of the virtual keypad, the size of each key may be adjustable to be smaller, keys arranged on a particular line (or row) may be deleted, or such deleted keys may be displayed on different positions. For example, function keys (e.g., language conversion key, space bar, Ctrl key, Alt key) arranged at the lowermost end of the virtual keypad may be displayable on different positions. However, such keys to be rearranged on different positions may not have to be displayed on the same line (or row).

In the meantime, as shown in FIG. 8b, in the state where the user touches a spot 410 on the uppermost end of the virtual keypad using his finger, if the user drags his finger in a specific direction (e.g., an upward direction) as if he pull the spot 410 up, then the controller 180 transforms the shape of the keypad in the dragged direction. Here, the controller 180 transforms the keypad to be in a reverse V-like (v) shape based upon an axis connecting the touched spot 410 of the uppermost end of the virtual keypad and a lowermost spot 440 corresponding to the spot 410. That is, the uppermost spot 410 is pulled up in the upwardly dragged direction and the lowermost spot 440 corresponding to the touched uppermost spot 410 are also pulled up. Accordingly, an inclination which connects the both side ends (e.g., left end and right end) and the touched spot 410 is increased such that the virtual keypad can generally be changed in the reverse V-like (v) shape.

However, in the state where the size of each key and the key arrangement are maintained, if the virtual keypad is transformed in the reverse V-like shape, even if the positions of both side ends are fixed, the touched spot 410 is raised in the dragged direction (i.e., an upward direction), resulting in a further increase in a region for displaying the virtual keypad.

Therefore, in order to prevent such further increase in the display region of the virtual keypad, the size of each key may be adjustable to be smaller, keys arranged on a particular line (or row) may be deleted, or such deleted keys may be displayed on different positions. For example, function keys (e.g., language conversion key, space bar, Ctrl key, Alt key) arranged at the lowermost end of the virtual keypad may be displayable on different positions. However, such keys to be rearranged on different positions may not have to be displayed on the same line (or row).

The method for transforming the shape of the virtual keypad described with reference to FIGS. 8a and 8b may be configured such that in the state where the spot on the lowermost end of the virtual keypad is touched, the touched spot is dragged in a specific direction (e.g., an upward or downward direction), such that the shape of the virtual keypad can be changed in the shape of V (e.g.,) or reverse V (e.g., ∧).

Meanwhile, the shape of the virtual keypad of the present invention may not have to be changed in a one-to-one correspondence with the dragged length. That is, the shape of the virtual keypad may not always be changed such that one end thereof is enlarged or shortened as same as the dragged length.

Furthermore, the shape of the virtual keypad may be transformable not only at the touched spot but also at a non-touched spot. In other words, the present invention is characterized in that how much the shape of the virtual keypad is transformable (e.g., the degree of raising both side ends) depends on the dragged direction and the dragged length.

For example, if one spot on the uppermost end of the virtual keypad is touched and dragged in a downward direction, the shape of the virtual keypad is changed in a V-like shape with a deeper valley in correspondence with the dragged length. That is, the positions of both of the side ends are further raised such that the virtual keypad can have the V-like shape with a much deeper valley. It is noticed that a length from the one spot of the uppermost end to the corresponding spot of the lowermost end is not shortened by the dragged length. It is rather possible to make size of keys larger which are adjacent to an axis connecting the one spot of the uppermost end to the one spot of the lowermost spot (hereinafter, such axis is referred to as a reference axis). By allowing keys closer to the reference axis to have larger sizes, a user can much easily enter such keys.

The shape of the virtual keypad which is changed according to the dragged direction and the dragged length may be preset. Also, positions of specific keys which are changed responsive to the change in the shape of the virtual keypad may be preset. An indicator related to particular information may also be displayed on an empty space which is newly generated when the shape of the virtual keypad is changed. In response to the change in the shape of the virtual keypad, it may be available to preset sizes which are to be changed for keys located at specific positions. Those information related to the preset shape of the virtual keypad may be stored in the memory 160.

As aforementioned, the method has been described in which when a spot of the virtual keypad is touched and then dragged in a pushing or pulling manner, for example, a length from the touched spot to another spot (e.g., an opposite spot corresponding to the touched spot) or another side end, or a position or shape of the another spot or another side end may automatically be changed in a preset keypad shape.

However, a user may select at least two or more spots on the virtual keypad to directly reform the virtual keypad to his desired shape by considering convenience of key input.

For example, in a state where one spot is fixed, the user may drag another spot in a desired direction so as to change the shape of the virtual keypad. Also, the virtual keypad may be divided into two keypads by a line connecting at least two spots, and thereafter each shape of the divided keypads may be changed. Furthermore, sizes of keys arranged on each divided keypad may be adjustable, each divided virtual keypad may be rotated or a position of each divided virtual keypad may be changed (moved).

Figure 9B:
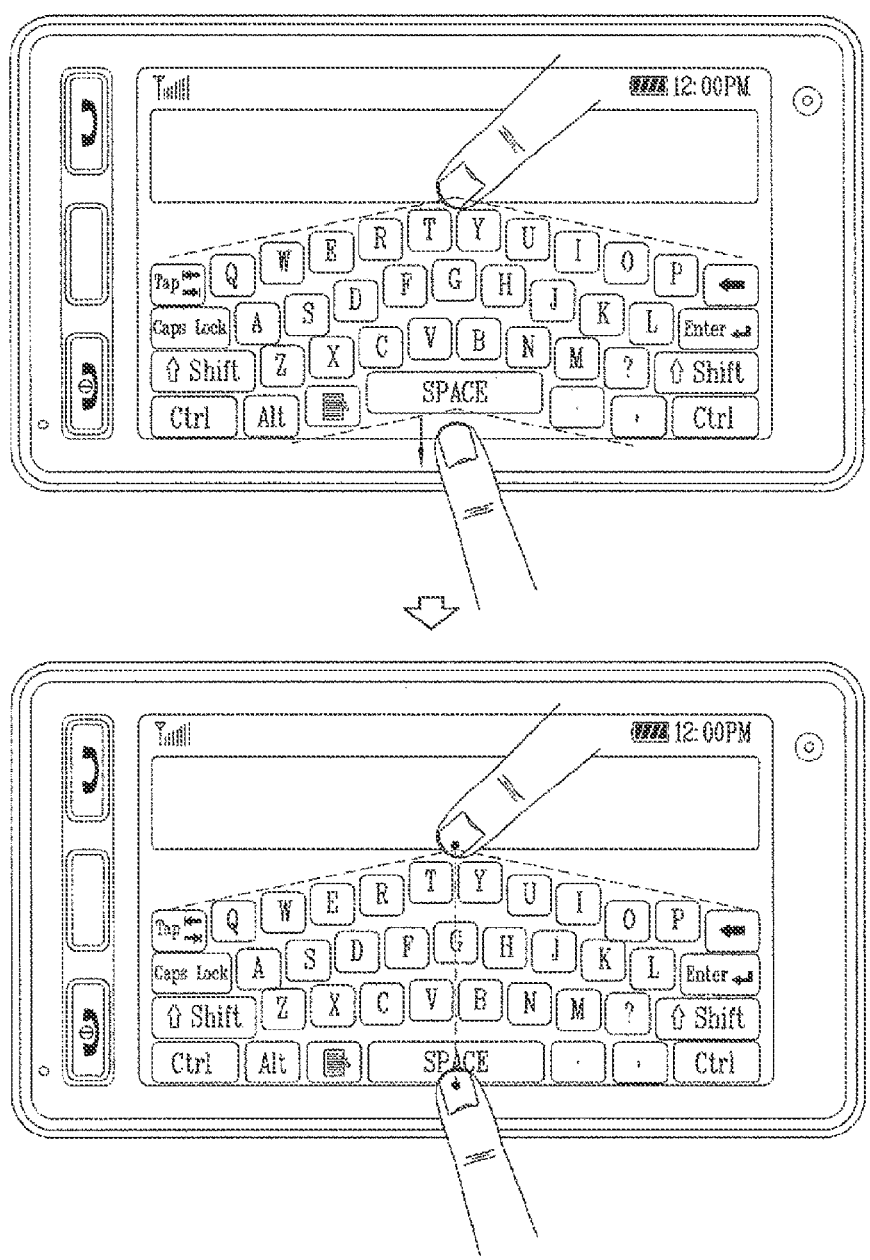
Figure 9C:
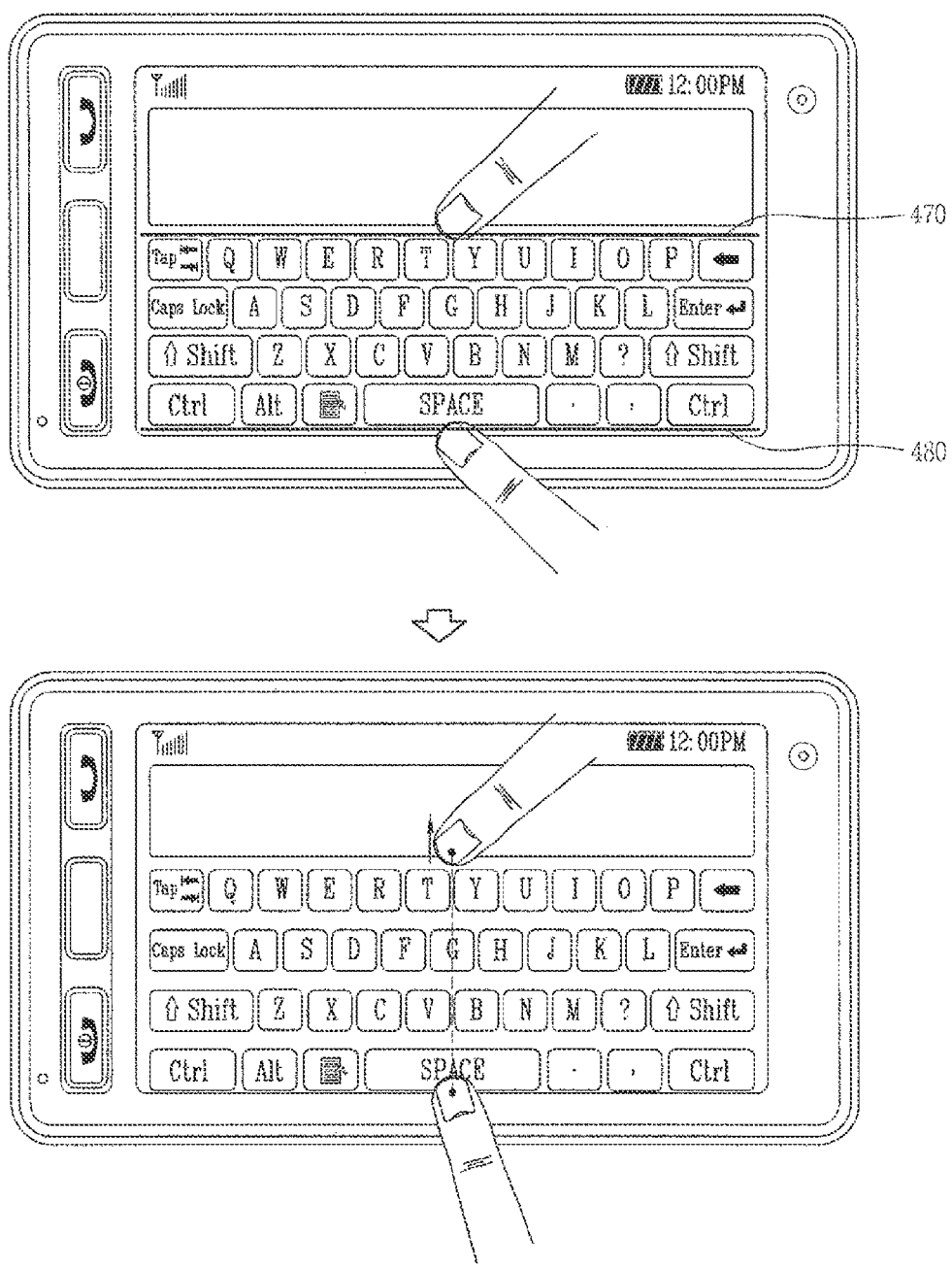

FIGS. 9a to 9c are exemplary views showing another method for changing a shape of a virtual keypad according to the present invention, which shows one of the methods for directly changing the shape of the virtual keypad to a shape which a user wants by selecting at least two or more spots.

The two spots may be in a form (type or shape) of point or line.

The form of point may indicate a spot between two keys, and the form of line may indicate a line or row formed between keys.

As shown in FIG. 9a, in a state of touching a spot 440 on the virtual keypad, a user touches another spot 410 to drag in a particular direction (e.g., an upward or downward direction). If the touched spot 440 is not dragged as shown above, the spot may be maintained with being fixed.

Therefore, in the another embodiment having aforesaid, in the state of touching the one spot 410 of the uppermost end, if the user drags the touched spot upwardly as if he pushes it up, the controller 180 has transformed the virtual keypad then to be partially folded in the reverse V-like (∧) shape based upon the axis connecting the touched spot and the another spot 440 of the lowermost end.

However, in this embodiment, in the state of the spot 440 of the lowermost end being fixed, if the spot 410 of the uppermost end is dragged upwardly, the controller 180 may transform only the uppermost end of the virtual keypad to a reverse V-like (∧) shape. Alternatively, as shown in FIG. 9b, in a state where the spot 410 of the uppermost end of the virtual keypad in the reverse V-like (∧) shape is fixed, if one spot 440 of the lowermost end is dragged downwardly, the controller 180 may transform only the uppermost end of the virtual keypad to the reverse V-like (∧) shape.

In the meantime, as shown in FIG. 9c, in a state of one line 480 of the virtual keypad being fixed, the user may drag another line 470 in a particular direction (e.g., an upward or downward direction). The height of the virtual keypad may be increased or decreased according to a direction in which another end (e.g., of the uppermost or lowermost end) is dragged in the sate of one end (e.g., of the uppermost or lowermost end) being fixed.

The two selectable lines may not always denote lines of the uppermost or lowermost end. A line corresponding to a line of a key arrangement may rather be selected or a line corresponding to a row of the key arrangement may be selected. If a line corresponding to a row is fixed and then another line corresponding to anther row is dragged, the width of the virtual keypad may be increased or decreased.

In the meantime, two spots may be selectable by a combination of the embodiments of FIGS. 9a and 9c. That is, one of two spots may be in the form of line and another spot may be in the form of point. In other words, a spot may be dragged in a state where one line corresponding to a line of a key arrangement is fixed, while a line may be dragged in a state of one spot being fixed.

Figure 10A:
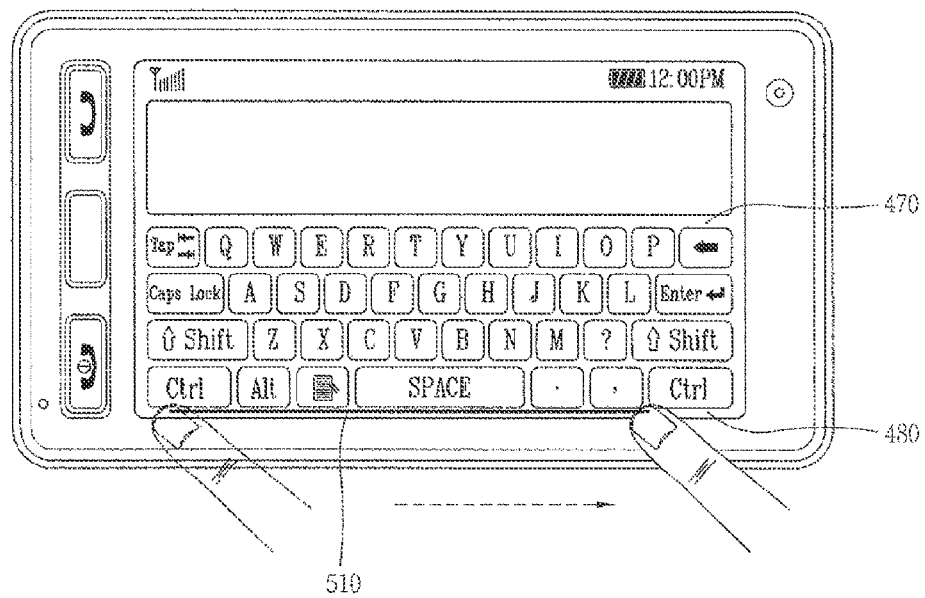
FIGS. 10a and 10b are exemplary views showing a method for selecting a spot in a shape of a line or point on a virtual keypad.
Figure 10B:
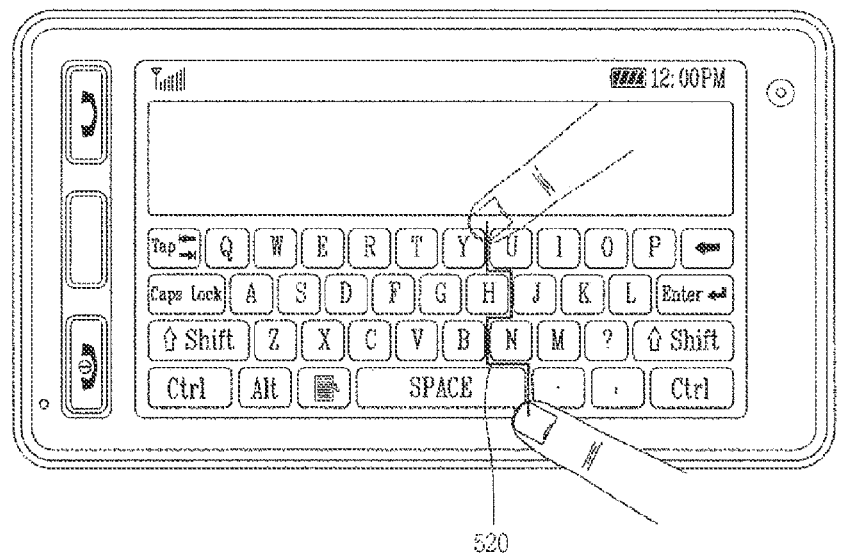

FIGS. 10a and 10b are exemplary views showing a method for selecting a spot in a form of a line or point on the virtual keypad.

Selecting one spot for transforming the shape of the virtual keypad may be set as a default to one of a form of point or a form of line according to an environment setup option. For example, if it is set as a default such that a spot of the virtual keypad is selected in the form of point, as shown in FIG. 10a, in a state of one spot of the virtual keypad being touched, a line 510 is drawn from the touched spot in a line direction so as to select the spot in the form of line. Alternatively, as shown in FIG. 10b, in a state of one spot of the virtual keypad being touched, a line 520 is drawn from the touched spot in a row direction so as to select the spot in the form of line.

Herein, the direction to draw the line may not be limited to the line direction or the row direction. Also, the line or row direction may not have to be straight, but be bent according to a type of arrangement of each keypad. In addition, the line may not always have to be drawn from one end (e.g., an uppermost end, a lowermost end, a left end or a right end) to another end.

The spot in the form of line may be selected in plurality in number.

When one spot is selected in the form of line, the line may be indicated. The indicating method may be one of changing color, thickness or brightness.

Figure 11A:
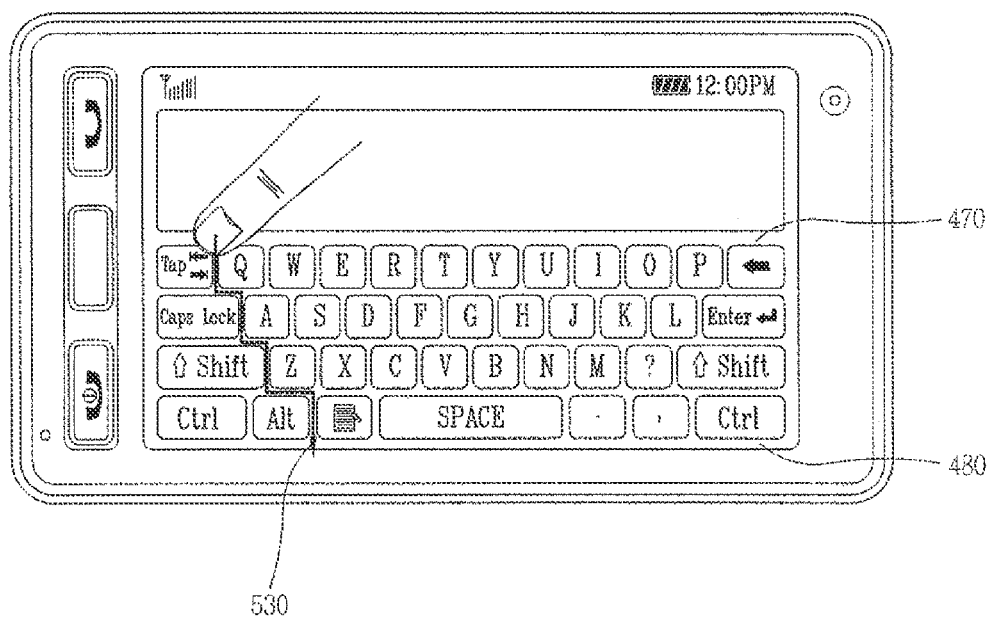
FIGS. 11a and 11b are exemplary views showing another method for changing the shape of a virtual keypad in accordance with the present invention.
Figure 11B:
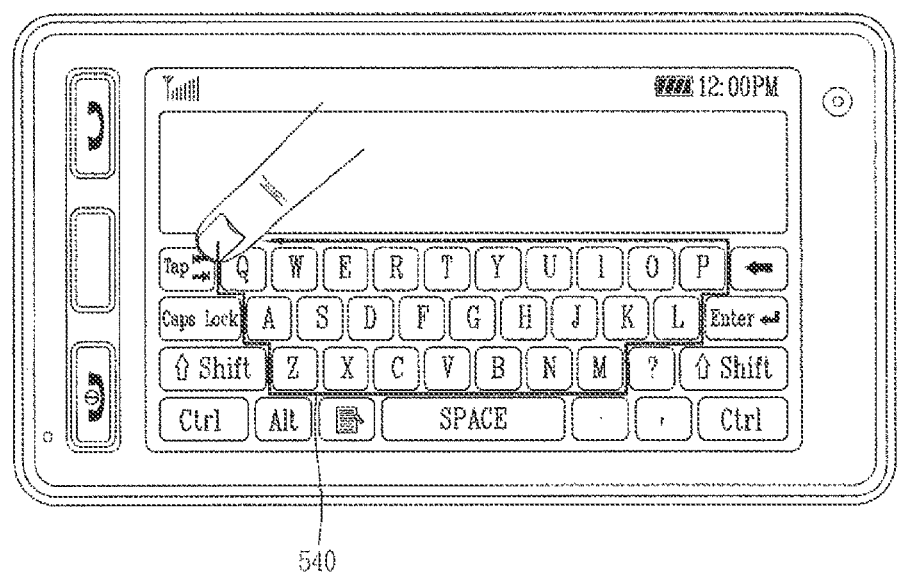

FIGS. 11a and 11b are exemplary views showing another method for changing a shape of a virtual keypad according to the present invention, particularly, shows a method for dividing a virtual keypad into at least two parts.

As shown in FIG. 11a, a user may draw a line 530 from one end (e.g., an uppermost end, a lowermost end, a left end or a right end) of the virtual keypad to another end thereof, so as to divide the virtual keypad. The line to divide the virtual keypad may not always have to be drawn horizontally or longitudinally, but be drawn to be oblique. Also, the line may be drawn to be bent according to a type of arrangement of each keypad.

As shown in FIG. 11b, a user may draw in a form of looped curve including specific keys. The looped curve may be drawn in a shape of curved line or in a polygonal shape. If the virtual keypad is divided by using the method drawing the looped curve, keys located within the looped curve may be moved to different positions.

The divided virtual keypad may be further divided into smaller units.

The divided virtual keypad may be divided based upon a key unit. That is, one key may be configured at one of the divided virtual keypads. However, specific function keys (e.g., space bar, Alt key, Ctrl key, Shift key, Enter key, Arrow key, and the like) may be constructed at both the divided virtual keypads.

One of the divided virtual keypads may be selected to be moved to a position desired by a user.

Figure 12A:
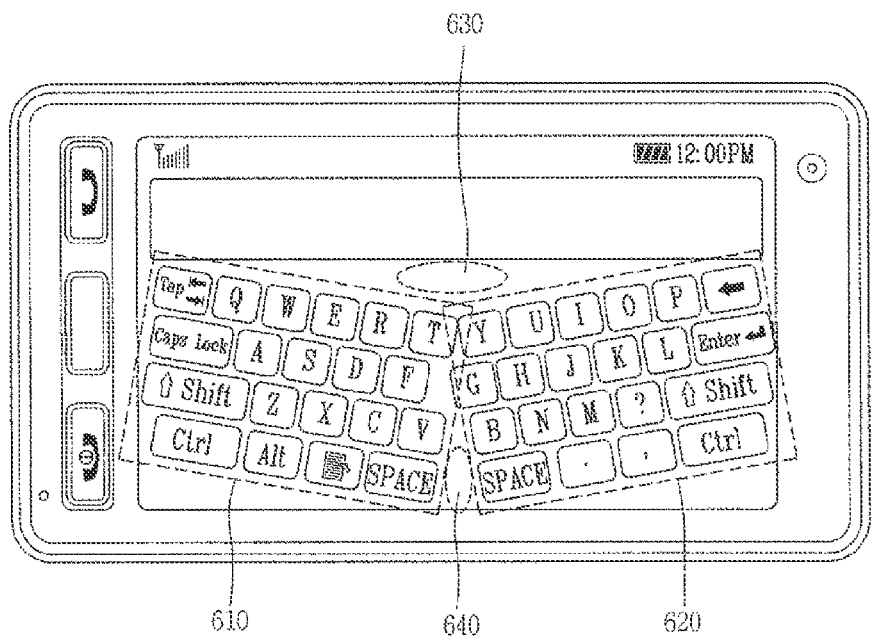
FIGS. 12a and 12b are exemplary views showing a method for changing a shape of a virtual keypad divided in accordance with the present invention.
Figure 12B:
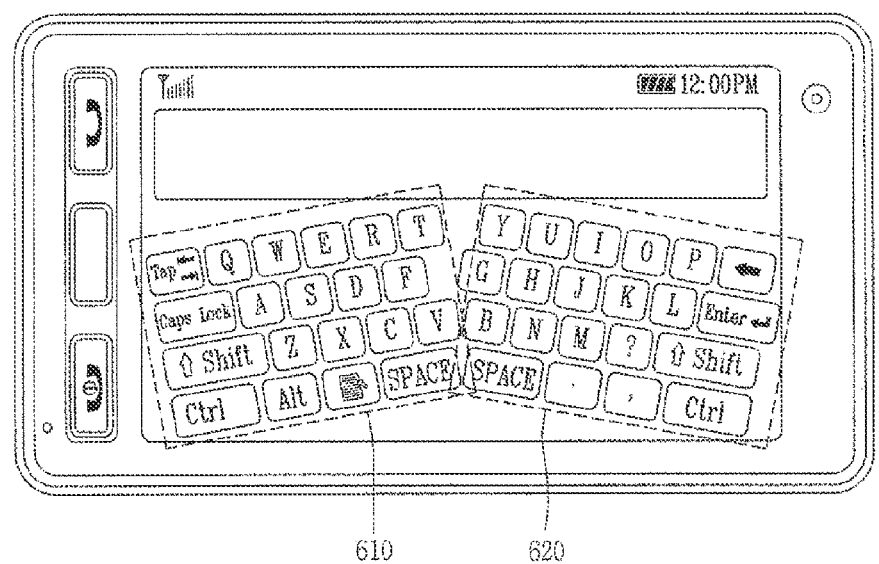

FIGS. 12a and 12b are exemplary view showing a method for changing shapes of divided virtual keypads according to the present invention.

For the sake of explanation, this embodiment assumes that the virtual keypad is divided into two parts 610 and 620.

After selecting one part 620 of the two divided virtual keypads 610 and 620, a user may select, as aforementioned, one spot of the selected virtual keypad 620 in a form (type, shape) of point or line, so as to change the shape of the selected virtual keypad 620.

Selecting the one spot and changing the shape of the virtual keypad may be implemented by employing the aforesaid method. Thus, hereinafter, only examples to be applicable to the divided virtual keypads may be described.

One of the divided virtual keypads is selected to be rotated by a particular angle. Accordingly, as shown in FIGS. 12a and 12b, the virtual keypads may be transformed into a V-like (v) shape or a reverse V-like (∧) shape in which the two virtual keypads are apart from each other. That is, the two virtual keypads are apart from each other to generate empty spaces 630 and 640. Accordingly, the empty spaces 630 and 640 may be used to display an indicator for indicating information related to an operation state of the virtual keypad.

Such transformed shape of the virtual keypad may be stored. After completing the transformation of the shape of the virtual keypad, a user may deactivate the virtual keypad transformation mode.

The terminal according to at least one embodiment of the present invention having such configuration can be implemented such that a user can change the shape of the virtual keypad to his desired shape or a key arrangement may be adjustable so as to improve user's convenience.

Also, in the present invention, a shape or size of each key constituting the virtual keypad may be changed according to the shape of the virtual keypad, or a position of each key may be changed (moved) so as to improve user's convenience for key input.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A terminal comprising:
a touchscreen; and
a controller configured to:
cause the touchscreen to display a data input region;
cause the touchscreen to display a virtual keypad to permit data entry into the data input region, wherein the virtual keypad comprises a plurality of keys with individually defined visual boundaries, wherein a first key group of the plurality of the keys is associated with alphabetic characters and include a character identifier visually identifying an associated alphabetic character;
cause the touchscreen to display the virtual keypad as visually divided first and second virtual keypads collectively comprising the plurality of keys in response to an input received at first and second locations of the displayed virtual keypad, wherein the first location is any one of a plurality of different locations of the virtual keypad and the second location is any one of a plurality of different locations of the virtual keypad;
cause a change in displayed size of one virtual keypad of the visually divided first and second virtual keypads in response to an input received at the one virtual keypad;
wherein the character identifiers of the keys of the first key group, and the visual boundaries of each of the plurality of keys, are always displayed while the data is being entered into the data input region via user input to the virtual keypad,
wherein the size of each of the plurality of keys of the first and second virtual keypads is relatively smaller than the size of a respective key of the plurality of keys of the virtual keypad prior to the dividing, and
wherein the input at the first location is a touch input and the input at the second location is a drag input that extends over a portion of the virtual keypad, wherein which keys that form the first and second keypads are defined according to the second location of the drag input.

2. The terminal of claim 1, wherein the controller is further configured to:
rotate each of the displayed first and second virtual keypads in response to an input.

3. The terminal of claim 1, wherein the controller is further configured to:
delete a key of the plurality of keys of the first virtual keypad or the second virtual keypad.

4. The terminal of claim 1, wherein the touchscreen comprises a proximity sensor and the touch input at the first location comprises a proximity touch input.

5. The terminal of claim 1, wherein the controller is further configured to:
cause the touchscreen to display information in a gap formed between the first virtual keypad and the second virtual keypad, wherein the information was not displayed, or was visually obscured, by the virtual keypad prior to receiving the input at the first location and the second location.

6. A method comprising:

displaying, on a touchscreen, a data input region;

displaying, on the touchscreen, a virtual keypad to permit data entry into the data input region, wherein the virtual keypad comprises a plurality of keys with individually defined visual boundaries, wherein a first key group of the plurality of the keys is associated with alphabetic characters and include a character identifier visually identifying an associated alphabetic character;

displaying, on the touchscreen, the virtual keypad as visually divided first and second virtual keypads collectively comprising the plurality of keys in response to an input received at first and second locations of the displayed virtual keypad, wherein the first location is any one of a plurality of different locations of the virtual keypad and the second location is any one of a plurality of different locations of the virtual keypad;

changing in displayed size of one virtual keypad of the visually divided first and second virtual keypads in response to an input received at the one virtual keypad;

wherein the character identifiers of the keys of the first key group, and the visual boundaries of each of the plurality of keys, are always displayed while the data is being entered into the data input region via user input to the virtual keypad during the text input mode, wherein the size of each of the plurality of keys of the first and second virtual keypads is relatively smaller than the size of a respective key of the plurality of keys of the virtual keypad prior to the dividing, and wherein the input at the first location is a touch input and the input at the second location is a drag input that extends over a portion of the virtual keypad, wherein which keys that form the first and second keypads are defined according to the second location of the drag input.

7. The method of claim 6, further comprising:

rotating each of the displayed first and second virtual keypads in response to an input.

8. The method of claim 6, further comprising:

deleting a key of the plurality of keys of the first virtual keypad or the second virtual keypad.

9. The method of claim 6, wherein the touchscreen comprises a proximity sensor and the touch input at the first location comprises a proximity touch input.

10. The method of claim 6, further comprising:

displaying, on the touchscreen, information in a gap formed between the first virtual keypad and the second virtual keypad, wherein the information was not displayed, or was visually obscured, by the virtual keypad prior to receiving the input at the first location and the second location.

11. The method of claim 6, wherein the drag input at the second location is received in a direction away from the first location.

12. The method of claim 6, wherein the drag input at the second location extends over a portion of the virtual keypad, wherein keys located at one side of the virtual keypad as defined by the second location of the drag input are keys which form the first virtual keypad and remaining keys of the virtual keypad form the second virtual keypad.

13. The method of claim 6, wherein the drag input at the second location extends over a portion of the virtual keypad to enclose a plurality of keys of the virtual keypad, wherein the enclosed plurality of keys are keys that form the first virtual keypad and remaining keys of the virtual keypad form the second virtual keypad.

14. The terminal of claim 1, wherein the drag input at the second location is received in a direction away from the first location.

15. The terminal of claim 1, wherein the drag input at the second location extends over a portion of the virtual keypad, wherein keys located at one side of the virtual keypad as defined by the second location of the drag input are keys which form the first virtual keypad and remaining keys of the virtual keypad form the second virtual keypad.

16. The terminal of claim 1, wherein the drag input at the second location extends over a portion of the virtual keypad to enclose a plurality of keys of the virtual keypad, wherein the enclosed plurality of keys are keys that form the first virtual keypad and remaining keys of the virtual keypad form the second virtual keypad.

* * * * *